(12) United States Patent
Azad (10) Patent No.: US 12,155,341 B2
(45) Date of Patent: Nov. 26, 2024

(54) SOLAR PANELS MOUNTED ON A BRIEFCASE

(71) Applicant: PREMIER SOLAR SYSTEMS INC., Victoria (CA)

(72) Inventor: Farsheed Azad, Victoria (CA)

(73) Assignee: PREMIER SOLAR SYSTEMS INC., Victoria (CA)

( * ) Notice: Subject to any disclaimer, the term of this patent is extended or adjusted under 35 U.S.C. 154(b) by 0 days.

(21) Appl. No.: 18/563,903

(22) PCT Filed: May 26, 2022

(86) PCT No.: PCT/CA2022/050857
§ 371 (c)(1),
(2) Date: Nov. 23, 2023

(87) PCT Pub. No.: WO2022/256914
PCT Pub. Date: Dec. 15, 2022

(65) Prior Publication Data
US 2024/0235455 A1    Jul. 11, 2024

(30) Foreign Application Priority Data
Jun. 11, 2021   (CA) ..................... 3121987

(51) Int. Cl.
*H02S 10/40*   (2014.01)
*H02S 20/30*   (2014.01)
*H02S 30/20*   (2014.01)

(52) U.S. Cl.
CPC .............. *H02S 10/40* (2014.12); *H02S 20/30* (2014.12); *H02S 30/20* (2014.12)

(58) Field of Classification Search
CPC ................................. H02S 10/40; H02S 30/20
See application file for complete search history.

(56) References Cited

U.S. PATENT DOCUMENTS

| | | | |
|---|---|---|---|
| 2010/0229919 A1* | 9/2010 | Benatar | F24S 25/10 136/246 |
| 2011/0220176 A1* | 9/2011 | Halpern | F24S 20/50 136/246 |
| 2011/0253614 A1 | 10/2011 | Curran et al. | |
| 2012/0291847 A1* | 11/2012 | Rowe, Jr. | H02S 30/20 320/101 |
| 2015/0061568 A1* | 3/2015 | Martinez | H02S 20/30 136/246 |
| 2015/0236637 A1 | 8/2015 | Sade | |
| 2015/0288319 A1* | 10/2015 | Hartman | H02S 20/30 136/246 |
| 2016/0036375 A1 | 2/2016 | Ansari | |
| 2018/0366789 A1* | 12/2018 | Petrella | H02S 40/38 |
| 2024/0007043 A1* | 1/2024 | Maughan | H02S 30/20 |

FOREIGN PATENT DOCUMENTS

| CN | 206226348 A | 6/2017 |
|---|---|---|
| KR | 2016-0015796 A | 2/2016 |

* cited by examiner

*Primary Examiner* — Daniel P Malley, Jr.

(57) ABSTRACT

Solar panels are mounted on a briefcase, which has a first solar panel array and a second solar panel array. Each solar panel array has at least three panels. The first solar panel array is located on the side of the briefcase. The second solar panel array is located in a slot inside of the briefcase (folded) and can be withdrawn and unfolded on top of the briefcase. The solar panels turn the briefcase into a "complete solar Power Generator" in one compact unit.

9 Claims, 7 Drawing Sheets

SOLAR PANELS MOUNTED ON A BRIEFCASE

FIELD

There is described solar panels mounted on a briefcase.

BACKGROUND

There are a number of Chinese Patents and Patent Publications that describe one or more solar panels mounted on or carried within a suitcase: CN210724635; CN103844536; CN106972611; CN106816946; CN204290816; and CN108577089.

SUMMARY

There is provided solar panels mounted on a briefcase. The briefcase has a first solar panel array and a second solar panel array. As will hereinafter be described, each solar panel array has at least three panels. The first solar panel array is located on the side of the briefcase. The second solar panel array is located in a slot inside of the briefcase (folded) and can be withdrawn and unfolded on top of the briefcase. The solar panels turn the briefcase into a "complete solar Power Generator" in one compact unit.

There is provided solar panels mounted on a briefcase which include a briefcase, a first solar panel array and a second solar panel array. The briefcase has a first face, a second face, a top, a bottom, a first end and a second end. The top has an opening slot which provides access to an interior of the briefcase. The first solar panel array includes a central solar panel, a first side solar panel, and a second side solar panel. The central solar panel has a first edge, a second edge opposed to the first edge, a third edge and a fourth edge opposed to the third edge. The first side solar panel is pivotally mounted by a first hinge to the first edge of the central solar panel. The second side solar panel is pivotally mounted by a second hinge to the second edge of the central solar panel. The first side solar panel is pivotally movable between a stored (folded) position parallel to the central solar panel and an operative position pivoted away from the central solar panel. The second side solar panel is pivotally movable between a stored (folded) position parallel to the central solar panel and an operative position pivoted away from the central solar panel. The central solar panel of the first solar panel array is mounted to the first face of the briefcase. The second solar panel array is movable between a first position within the interior of the briefcase and a second position outside of the briefcase. The second solar panel array includes a central solar panel, a first side solar panel, and a second side solar panel. The central solar panel has a first edge, a second edge opposed to the first edge, a third edge and a fourth edge opposed to the third edge. The first side solar panel is pivotally mounted by a first hinge to the first edge of the central solar panel. The second side solar panel is pivotally mounted by a second hinge to the second edge of the central solar panel. The first side solar panel is pivotally movable between a stored (folded) position parallel to the central solar panel and an operative position pivoted away from the central solar panel. The second side solar panel is pivotally movable between a stored (folded) position parallel to the central solar panel and an operative position pivoted away from the central solar panel. When the first side solar panel and the second side solar panel are both in the stored (folded) position, the second solar panel array slides through the opening slot in the top and into the first position within the interior of the briefcase.

The solar panels mounted on a briefcase, as described above, provides an advance in the art by providing an increased solar collection area. Power generation of portable solar power units is always limited by the solar collection area.

Although the first side solar panel and the second side solar panel could be placed in a stored (folded) position in overlapping relationship, even more beneficial results may be obtained when the first side solar panel and the second side solar panel in both the first solar panel array and the second solar panel array are in abutting end to end relation when in the stored (folded) position. This configuration reduces the thickness of the first solar panel array and the second solar panel array. When the thickness of the first solar panel array and the second solar panel array is reduced, it enables the power generation unit to be smaller. The term "suitcase" is the term used in the prior art. However, the term "briefcase" has been used in describing the present invention as it more accurately describes the size of the device.

In the northern hemisphere, the general rule for solar panel placement is, solar panels should face "solar south". The first solar panel array and the second solar panel array are more effective when they can be positioned to face solar south. Of course, the briefcase could be laid onto the second face to place the first solar panel array and the second solar panel array in a horizontal orientation. However, an angular orientation gives the solar panels the best exposure to the sun. Even more beneficial results may, therefore, be obtained when the first solar panel array and the second solar panel array are pivotally mounted to the briefcase, thereby enabling the first solar panel array to be angularly adjusted. There are various ways this angular mounting can be accomplished. A preferred method, as will hereinafter be described, is through the use of one or more mounting arms. Two mounting arms have been illustrated. It will, however, be understood that one large mounting arm may be used or two or more smaller mounting arms.

It will be appreciated that it is not absolutely essential that the first hinge and the second hinge of the first solar panel array and the second solar panel array need not be locked in the operative position. However, it is preferred that a first hinge lock is positioned on one of the third edge or the fourth edge. The first hinge lock straddles between the central solar panel and the first side solar panel to prevent pivoting of the first hinge. Similarly, a second hinge lock is positioned on one of the third edge or the fourth edge. The second hinge lock straddled between the central solar panel and the second side solar panel to prevent pivoting of the second hinge. There will hereinafter be described slide mechanisms that serve as the first hinge lock and the second hinge lock by sliding along the third edge into a locking position. It will be appreciated that there are different configurations of hinge locks that could be used. It will also be appreciated that the slide mechanisms could be positioned on the fourth edge instead of the third edge.

The first side solar panel and the second side solar panel of the first solar panel array have a first face and a second face. It is preferred that both the first face and the second face function as solar panels, regardless of which face is exposed to the sun. This enables the first side solar panel and the second side solar panel will continue to be exposed to the sun and continue to function when placed in the stored (folded) position. If only one of the first face or the second face were capable of functioning as solar collectors, power generation through the first solar panel array would cease when the first side solar panel and the second side solar panel were placed into the stored (folded) position.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
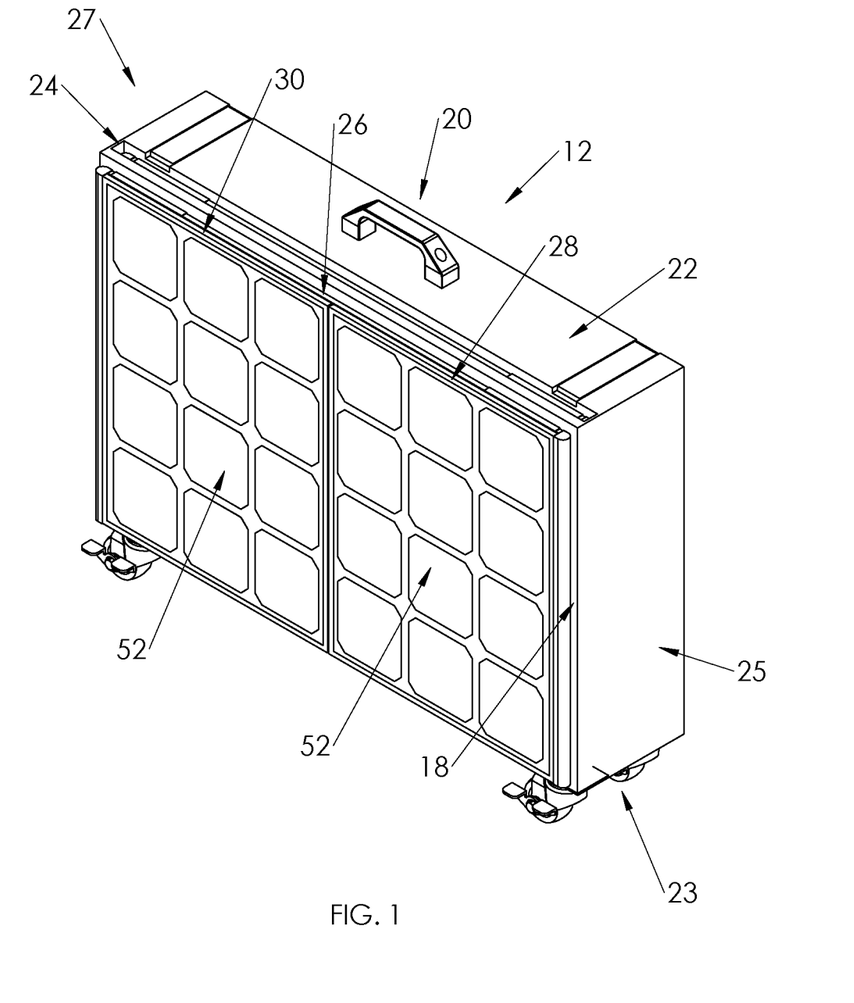
FIG. 1 is a front perspective view of a solar panels mounted on a briefcase.
Figure 4:
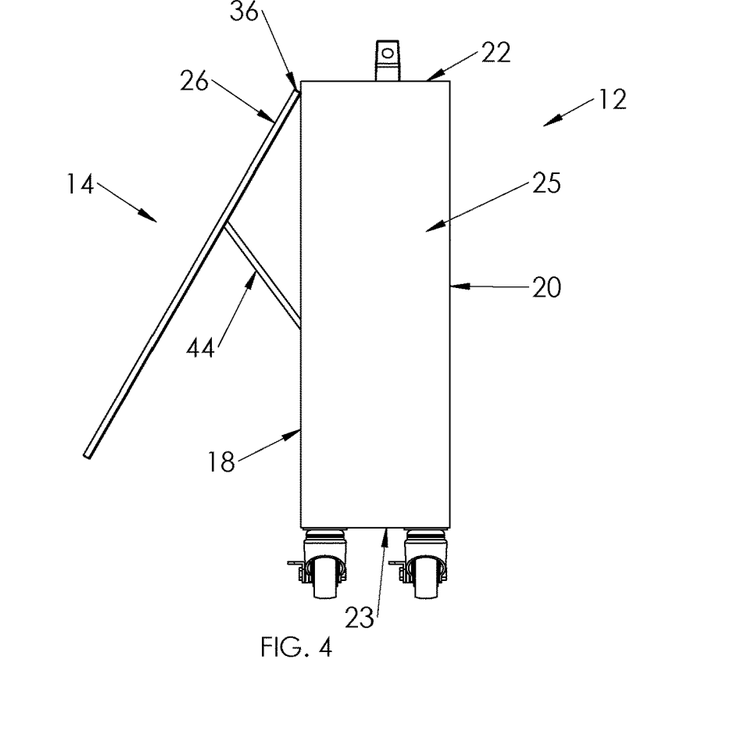
FIG. 4 is an end elevation view of the solar panels mounted on a briefcase of FIG. 3.
Figure 6:
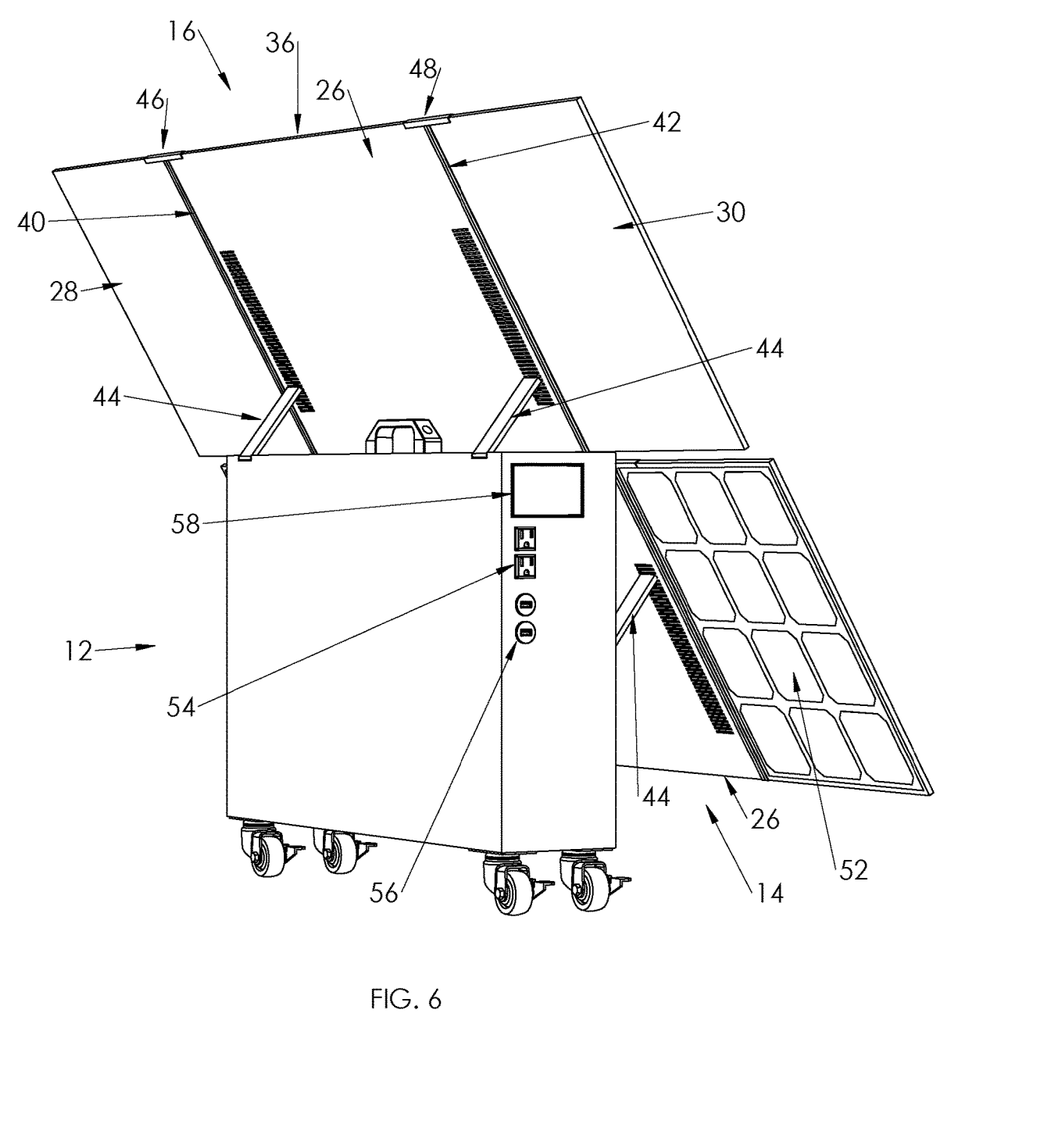
FIG. 6 is a rear perspective view of the briefcase mounted solar panel array of FIG. 5.
Figure 7:
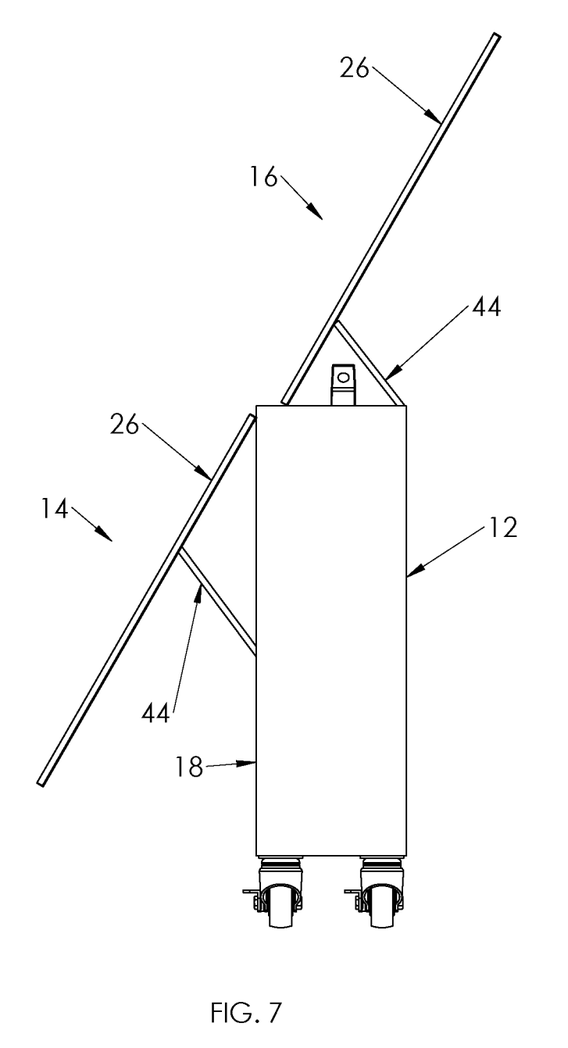
FIG. 7 is an end elevation view of the solar panels mounted on a briefcase of FIG. 5.

Solar panels mounted on a briefcase will now be described with reference to FIG. 1 through FIG. 8.
Structure and Relationship of Parts:

Referring to FIG. 6 and FIG. 7, solar panels mounted on a briefcase include a briefcase 12, a first solar panel array 14 and a second solar panel array 16. Referring to FIG. 1 and FIG. 4, briefcase 12 has a first face 18, a second face 20, a top 22, a bottom 23, a first end 25 and a second end 27. Referring to FIG. 1, top 22 has an opening slot 24 which provides access to an interior (not shown) of briefcase 12.

Figure 2:
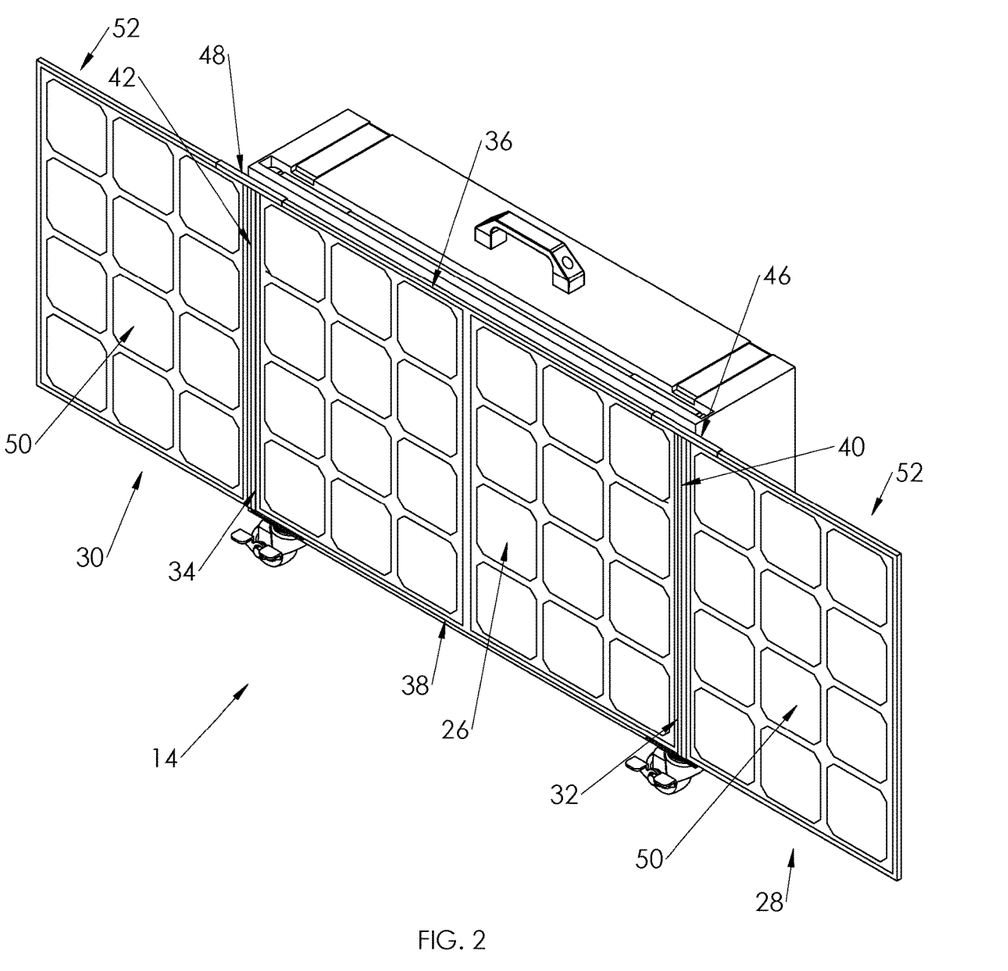
FIG. 2 is a front perspective view of the solar panels mounted on a briefcase of FIG. 1, with a first solar panel array deployed.

Referring to FIG. 2, first solar panel array 14 includes a central solar panel 26, a first side solar panel 28, and a second side solar panel 30. Central solar panel 26 has a first edge 32 (right side), a second edge 34 (left side) opposed to first edge 32, a third edge 36 (top edge) and a fourth edge 38 (bottom edge) opposed to third edge 36. First side solar panel 28 is pivotally mounted by a first hinge 40 to first edge 32 of central solar panel 26. Second side solar panel 30 is pivotally mounted by a second hinge 42 to second edge 34 of central solar panel 26. First side solar panel 28 is pivotally movable between a stored (folded) position parallel to central solar panel 26 as shown in FIG. 1 and an operative position pivoted away from central solar panel 26, as shown in FIG. 2. Second side solar panel 30 is pivotally movable between a stored (folded) position parallel to central solar panel 26, as shown in FIG. 1 and an operative position pivoted away from central solar panel 26, as shown in FIG. 2. Referring to FIG. 1, when first side solar panel 28 and second side solar panel 30 are in the stored (folded) position, first side solar panel 28 and second side solar panel 30 are in abutting end to end relation.

Referring to FIG. 4, FIG. 6 and FIG. 7, central solar panel 26 of first solar panel array 14 is pivotally mounted to the first face 18 of briefcase 12, thereby enabling first solar panel array 14 to be angularly adjusted. This is accomplished through the use of two mounting arms 44.

Figure 5:
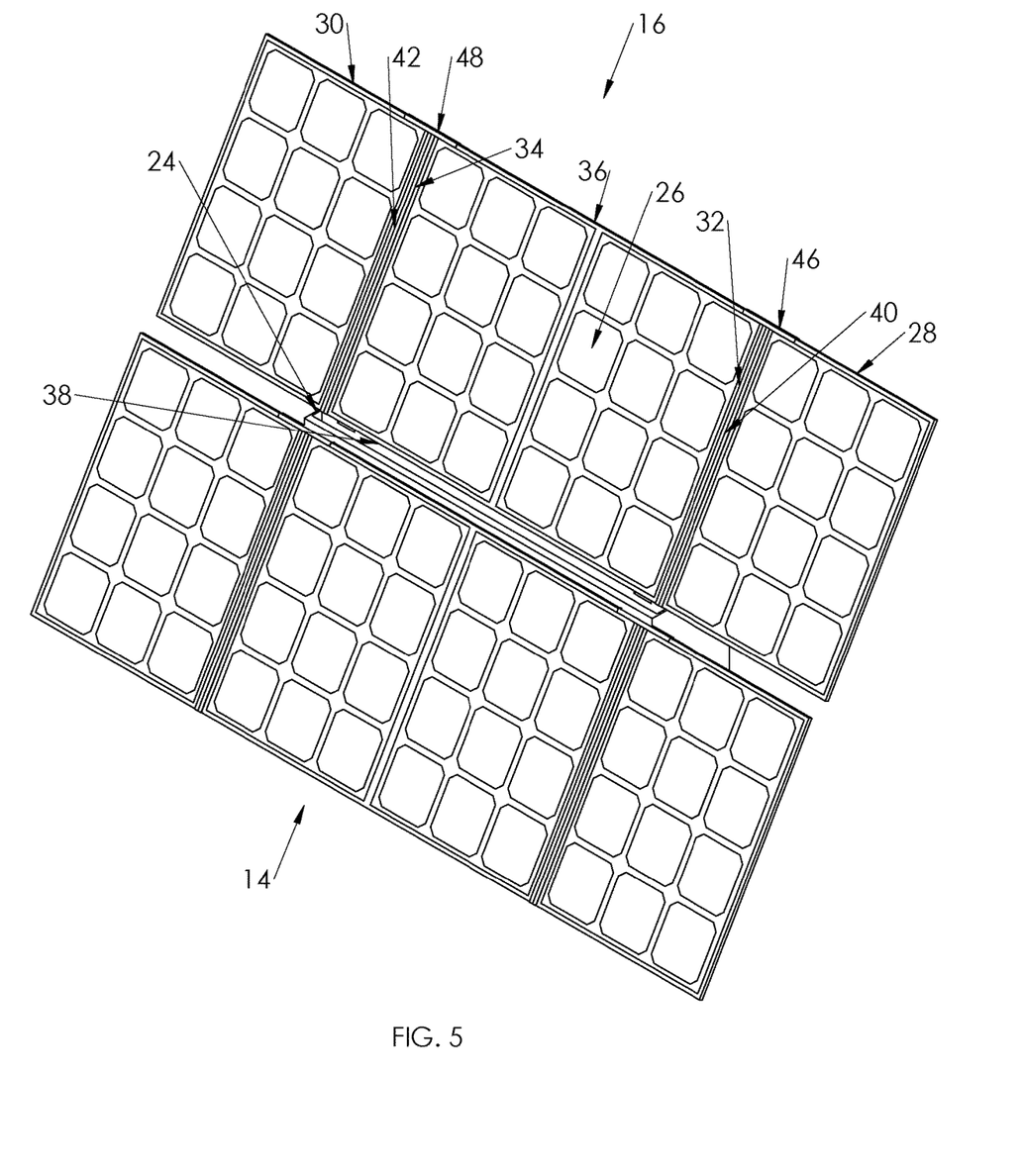
FIG. 5 is a front perspective view of the solar panels mounted on a briefcase of FIG. 3, with both the first solar panel array and a second solar panels deployed and angularly adjusted.

Referring to FIG. 5, second solar panel array 16 is a similar to first solar panel array 14. Second solar panel array 16 includes a central solar panel 26, a first side solar panel 28, and a second side solar panel 30. Central solar panel 26 has a first edge 32 (right side), a second edge 34 (left side) opposed to first edge 32, a third edge 36 (top edge) and a fourth edge 38 (bottom edge) opposed to third edge 36. First side solar panel 28 is pivotally mounted by a first hinge 40 to first edge 32 of central solar panel 26. Second side solar panel 30 is pivotally mounted by a second hinge 42 to second edge 34 of central solar panel 26. First side solar panel 28 is pivotally movable between a stored (folded) position parallel to central solar panel 26 as shown and described in relation to first solar panel array 14 and an operative position pivoted away from central solar panel 26, as shown in FIG. 5. Second side solar panel 30 is pivotally movable between a stored (folded) position parallel to central solar panel 26, as shown and described in relation to first solar panel array 14 and an operative position pivoted away from central solar panel 26, as shown in FIG. 5. As shown and described with reference to first solar panel array 14, when first side solar panel 28 and second side solar panel 30 are in the stored (folded) position, first side solar panel 28 and second side solar panel 30 are in abutting end to end relation. There is one difference between first solar panel array 14 and second solar panel array 16. First side solar panel 28 and second side solar panel 30 of first solar panel array 14 are "two sided" as will hereinafter be further described.

When first side solar panel 28 and second side solar panel 30 of second solar panel array 16 are both in the stored (folded) position, second solar panel array 16 slides through opening slot 24 in top 22 and into the interior of briefcase 12. It can, therefore, be said that second solar panel array 16 is movable between a first position within the interior of briefcase 12 and a second position outside of briefcase 12.

Referring to FIG. 6 and FIG. 7, central solar panel 26 of second solar panel array 16 is pivotally mounted to briefcase 12, thereby enabling second solar panel array 16 to be angularly adjusted. As with first solar panel array 14, this is accomplished through the use of two mounting arms 44.

Figure 3:
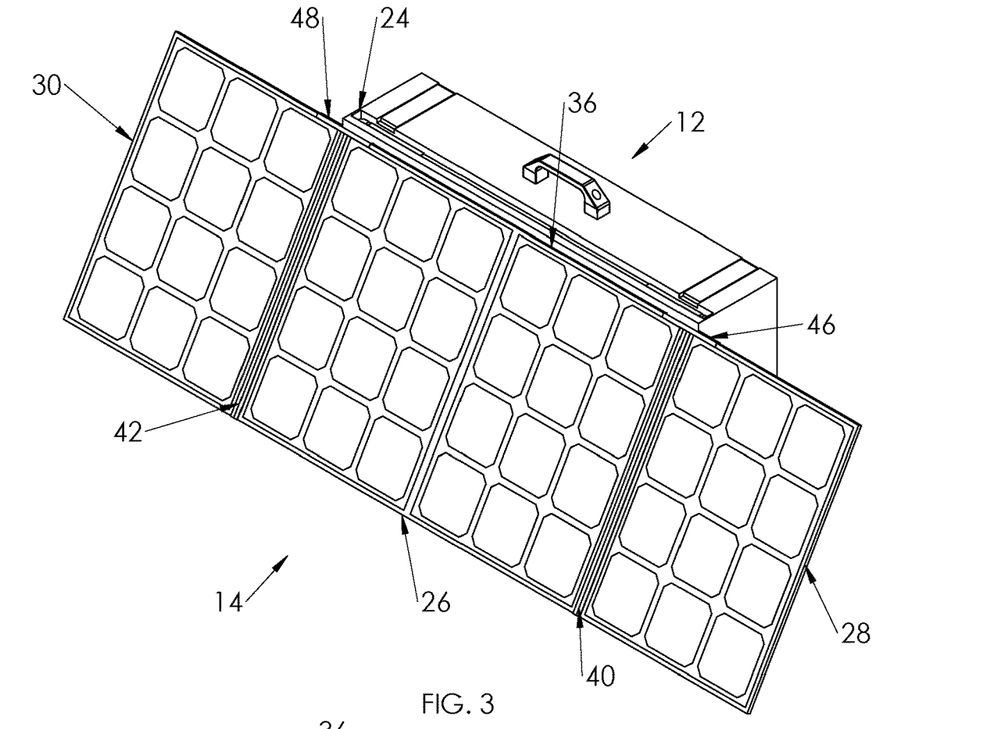
FIG. 3 is a front perspective view of the solar panels mounted on a briefcase of FIG. 2, with the first solar panel array angularly adjusted.

Both first solar panel array 14 and second solar panel array 16 use the same form of hinge lock. With respect to first solar panel array 14, this is illustrated in FIG. 2 and FIG. 3. With respect to second solar panel array 16, this is illustrated in FIG. 5 and FIG. 6. Referring to FIG. 2 and FIG. 3, there is a first hinge lock 46 and a second hinge lock 48 positioned on third edge 36 of central solar panel 26. First hinge lock 46 and second hinge lock 48 slide along third edge 36. When first hinge lock 46 straddles between central solar panel 26 and first side solar panel 28 first hinge 40 is prevented from pivoting. When second hinge lock 48 straddles between central solar panel 26 and second side solar panel 30 second hinge 42 is prevented from pivoting.

Referring to FIG. 2, first side solar panel 28 and second side solar panel 30 of first solar panel array 14 have a first face 50 and a second face 52. It is preferred that both first face 50 and second face 52 are reactive to light. Referring to FIG. 1, when first side solar panel 28 and second side solar panel 30 are placed in the stored (folded) position second face 52 is exposed to solar radiation and will continue to function as a solar collector. If only first face 50 was capable of functioning as a solar collector, power generation through first solar panel array 14 would cease when first side solar panel 28 and second side solar panel 30 were placed into the stored (folded) position.

Figure 8:
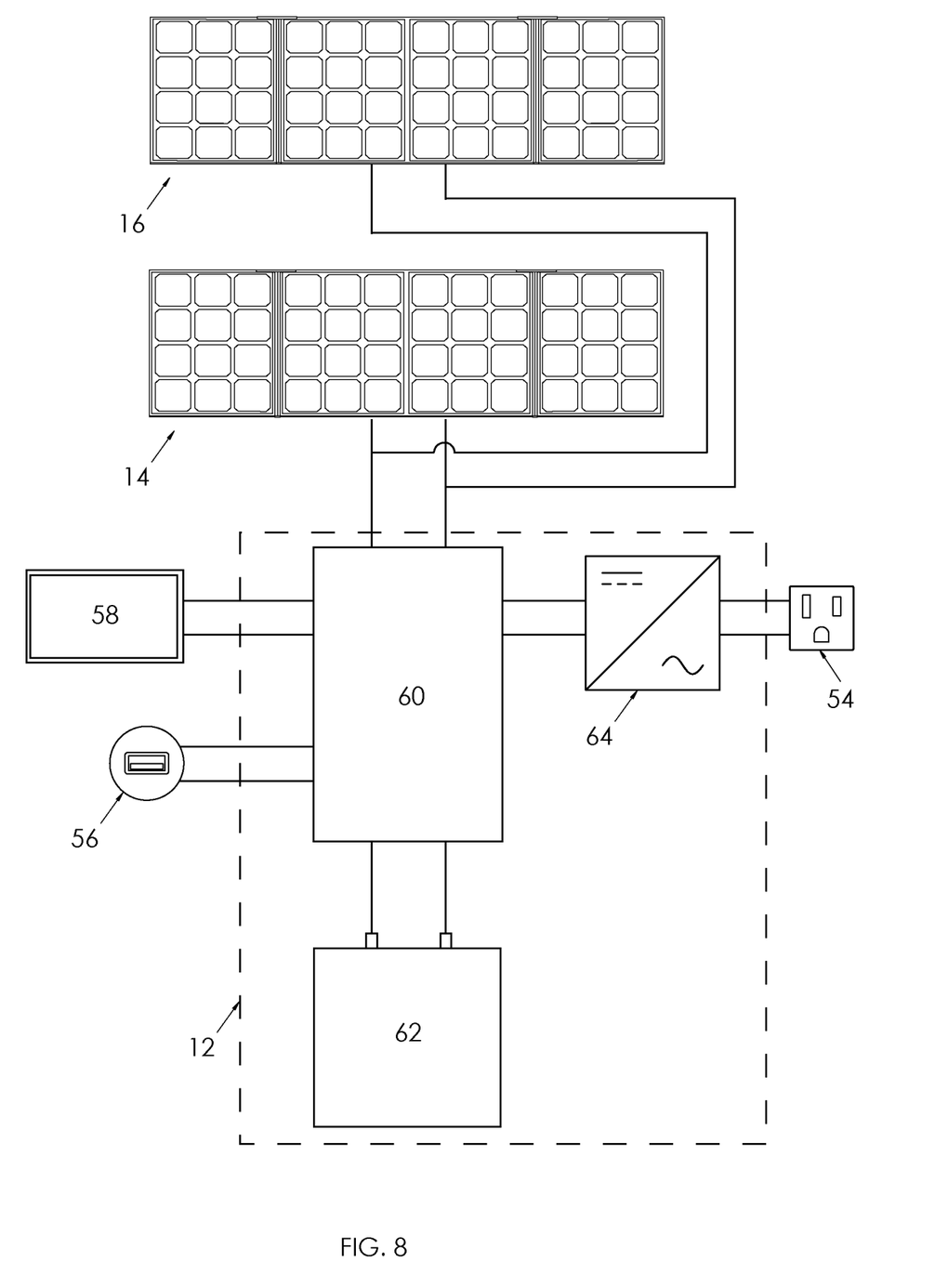
FIG. 8 is a schematic view illustrating how the solar panels mounted on a briefcase are integrated into a power generation system.

Referring to FIG. 6, there is shown two alternating current (AC) outlets 54 and two USB ports 56 and a display panel 58. Referring to FIG. 8, first solar panel array 14 and second solar panel array 16 are connected to a charge controller 60 which stores the electricity generated by first solar array 14 and second solar panel array 16 in a battery 62. The charging process and the operation of charge controller 60 is monitored through display panel 58. The direct current produced is converted to AC current by inverter 64. AC current is accessed through AC outlets 54. USB ports 56 facilitate USB connections with charge controller 60.

It will be appreciated that the solar panels may be made from a variety of materials, such as Cadmium Telluride, Polycrystalline, Single Crystal Silicon, Cadmium Telluride, Amorphous Silicon. It will be appreciated that there are various types of batteries that may be used, such as Lithium, lead-acid, or Nickel Hydrogen.

Referring to FIG. 1 and FIG. 3, briefcase 12 has caster wheels mounted to bottom 23. Levers are provided to allow these caster wheels to be locked to provide stability to briefcase 12 when the solar panels are deployed.

Operation:

Referring to FIG. 1, briefcase 12 is carried to a remote field location where power is required. During transport, first side solar panel 28 and second side solar panel 30 of first solar panel array 14 are in the stored (folded) position, in abutting end to end relation overlying and parallel to central solar panel 26.

Referring to FIG. 2, upon arrival at the remote location, first side solar panel 28 is pivoted about first hinge 40 into the operative position and second side solar panel 30 is pivoted about second hinge 42 into the operative position. First hinge lock 46 is then slide along third edge 36 and into a positioning straddling between central solar panel 26 and first side solar panel 28 to prevent first hinge 40 from pivoting. Second hinge lock 48 is then slid along third edge 36 and into position straddling between central solar panel 26 and second side solar panel 30 to prevent second hinge 42 from pivoting.

Referring to FIG. 3 and FIG. 4, mounting arms 44 mounting central solar panel 26 of first solar panel array 14 to first face 18 of briefcase 12 are used to angularly adjust the positioning of first solar panel array 14.

Referring to FIG. 1, during transport first side solar panel 28 and second side solar panel 30 of second solar panel array 16 are in the stored (folded) position, in abutting end to end relation overlying and parallel to central solar panel 26. Second solar panel array 16 within the interior of briefcase 12.

Referring to FIG. 5 and FIG. 6, second solar panel array 16 is drawn from the interior of briefcase 12 through opening slot 24 and positioned outside of briefcase 12. Once outside of briefcase 12, second solar panel array 16 is deployed in a similar manner to that described in relation to first solar panel array 14. First side solar panel 28 is pivoted about first hinge 40 into the operative position and second side solar panel 30 is pivoted about second hinge 42 into the operative position. First hinge lock 46 is then slide along third edge 36 into a positioning straddling between central solar panel 26 and first side solar panel 28 to prevent first hinge 40 from pivoting. Second hinge lock 48 is then slid along third edge 36 into position straddling between central solar panel 26 and second side solar panel 30 to prevent second hinge 42 from pivoting.

Referring to FIG. 6 and FIG. 7, mounting arms 44 mounting central solar panel 26 of second solar panel array 16 are used to angularly adjust the positioning of second solar panel array 16.

Referring to FIG. 6, operation is monitored through display panel 58. Shown on display panel 58 would be information necessary to monitor solar input, electricity output, battery status and charging.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A device, comprising:
   a briefcase having a first face, a second face, a top, a bottom, a first end and a second end, the top having a slot providing access to an interior of the briefcase;
   a first solar panel array, comprising a central solar panel, a first side solar panel, and a second side solar panel, the central solar panel having a first edge, a second edge opposed to the first edge, a third edge and a fourth edge opposed to the third edge, the first side solar panel is pivotably mounted by a first hinge to the first edge of the central solar panel, the second side solar panel is pivotably mounted by a second hinge to the second edge of the central solar panel, the first side solar panel is pivotably movable between a folded position parallel to the central solar panel and an operative position pivoted away from the central solar panel, the second side solar panel is pivotably movable between a folded position parallel to the central solar panel and an operative position pivoted away from the central solar panel, the central solar panel of the first solar panel array is mounted to the first face, wherein the first side solar panel and the second side solar panel of the first solar panel array have a first face and a second face, both the first face and the second face being reactive to light, such that the first side solar panel and the second side solar panel continue to function as solar collectors when placed in the stored position, and when deployed the first solar panel array is pivotably mounted to the briefcase by the central panel so as to allow the first solar panel array to be angularly adjusted by pivoting; and
   a second solar panel array movable between a first position contained within the slot and a second position outside of the briefcase, the second solar panel array comprising a central solar panel, a first side solar panel, and a second side solar panel, the central solar panel having a first edge, a second edge opposed to the first edge, a third edge and a fourth edge opposed to the third edge, the first side solar panel is pivotably mounted by a first hinge to the first edge of the central solar panel, the second side solar panel is pivotably mounted by a second hinge to the second edge of the central solar panel, the first side solar panel is pivotably movable between a folded position parallel to the central solar panel and an operative position pivoted away from the central solar panel, the second side solar panel is pivotably movable between a folded position parallel to the central solar panel and an operative position pivoted away from the central solar panel, when the first side solar panel and the second side solar panel are both in the folded position the second solar panel array slides through the slot and into the first position within the interior of the briefcase, and when deployed is pivotably mounted to the briefcase by the central panel so as to allow the second solar panel array to be angularly adjusted by pivoting.

2. The device of claim 1, wherein the first side solar panel and the second side solar panel of the first solar panel array are in abutting end to end relation when in the stored position.

3. The device of claim 1, wherein the first side solar panel and the second side solar panel of the second solar panel array are in abutting end to end relation when in the stored position.

4. The device of claim 1, wherein the first solar panel array is pivotably mounted to the briefcase by one or more mounting arms.

5. The device of claim 1, wherein the second solar panel array is pivotably mounted to the briefcase by one or more mounting arms.

6. The device of claim 1, wherein a first hinge lock is positioned on one of the third edge or the fourth edge of the central solar panel of the first solar panel array, the first hinge lock straddling between the central solar panel and the first side solar panel to prevent pivoting of the first hinge and a second hinge lock is positioned on one of the third edge or the fourth edge of the central solar panel of the first solar panel array, the second hinge lock straddling between the central solar panel and the second side solar panel to prevent pivoting of the second hinge.

7. The device of claim 6, wherein the first hinge lock and the second hinge lock slide along one of the third edge or the fourth edge of the central solar panel of the first solar panel array.

8. The device of claim 1, wherein a first hinge lock is positioned on one of the third edge or the fourth edge of the central solar panel of the second solar panel array, the first hinge lock straddling between the central solar panel and the first side solar panel to prevent pivoting of the first hinge and a second hinge lock is positioned on one of the third edge or the fourth edge of the central solar panel of the second solar panel array, the second hinge lock straddling between the central solar panel and the second side solar panel to prevent pivoting of the second hinge.

9. The device of claim 8, wherein the first hinge lock and the second hinge lock slide along one of the third edge or the fourth edge of the central solar panel of the second solar panel array.

* * * * *